United States Patent [19]

Sato

[11] Patent Number: 4,832,510
[45] Date of Patent: May 23, 1989

[54] LINEAR MOTION ROLLING-CONTACT BEARING ASSEMBLY HAVING A LOCALLY REINFORCED GUIDE WALL

[75] Inventor: Osamu Sato, Seki, Japan

[73] Assignee: Nippon Thompson Co., Ltd., Tokyo, Japan

[21] Appl. No.: 167,066

[22] Filed: Mar. 11, 1988

[30] Foreign Application Priority Data

Mar. 12, 1987 [JP] Japan .................................. 62-55146

[51] Int. Cl.$^4$ .............................................. F16C 29/06
[52] U.S. Cl. .......................................... 384/44; 384/45
[58] Field of Search ............................. 384/43, 44, 45

[56] References Cited

U.S. PATENT DOCUMENTS

| | | | |
|---|---|---|---|
| 4,472,003 | 9/1984 | Osawa | 384/45 |
| 4,496,196 | 1/1985 | Teramachi | 384/45 |
| 4,692,036 | 9/1987 | Kawaguchi | 384/44 |

FOREIGN PATENT DOCUMENTS 60-17540 10/1982 Japan .

*Primary Examiner*—Thomas R. Hannon
*Attorney, Agent, or Firm*—Skjerven, Morrill, MacPherson, Franklin and Friel

[57] ABSTRACT

An endless linear motion roller bearing assembly includes a rail, a slider and a plurality of rollers interposed between the rail and the slider. The slider is provided with at least one endless circulation path which includes a load path section defined between the slider and the rail, a return path section and a pair of curved connecting path sections, each connecting the corresponding ends of the load and return path sections. The rollers roll along the endless circulation path back and forth to provide a limitless relative motion between the rail and the slider. Each of the curved connecting path section is typically semicircular in shape and its outer half wall surface is defined by a V-shaped guide plate of a thin steel plate. Preferably, the V-shaped guide plate is formed with a tongue at one end where the curved connecting path section is connected to the load path section to provide a smooth transition. In addition, the V-shaped guide plate is formed with a mating projection which projects outward from a surface of the end block to be fitted into a mating recess formed in a side cover plate to thereby provide a smooth transition between the curved connecting path section and the return path section.

7 Claims, 5 Drawing Sheets

LINEAR MOTION ROLLING-CONTACT BEARING ASSEMBLY HAVING A LOCALLY REINFORCED GUIDE WALL

BACKGROUND OF THE INVENTION

1. Field of the Invention

This invention generally relates to a linear motion rolling-contact bearing assembly including a rail, a slider and a plurality of rolling members interposed between the rail and the slider to provide a rolling contact therebetween, and in particular to an endless linear motion roller bearing assembly including an endless circulation path defined between the rail and the slider for rollers which provide a rolling contact therebetween.

2. Description of the Prior Art

An endless linear motion rolling contact bearing assembly is well known in the art and, in general, it includes a rail, a slider, a plurality of endless circulation paths defined between the rail and the slider and a plurality of rolling members provided in the plurality of endless circulation paths for providing a rolling contact between the rail and the slider to thereby provide a relative linear motion between the slider and the rail. The rolling members may be either balls or rollers depending on applications. Each endless circulation path for the rolling members includes a load path section, a return path section and a pair of connecting path sections each connecting the corresponding ends of the load and return path sections. The load and return path sections are typically straight and the pair of connecting path sections are curved, typically semicircular. Since the endless circulation path defines an endless loop, the rolling members provided in the endless circulation path may roll indefinitely to thereby provide theoretically an indefinite length of a relative motion between the rail and the slider.

As the operating speed of an endless linear motion rolling contact bearing assembly increases, the centrifugal force acting in each of the rolling members as it rolls along the curved connecting path section increases and thus the rolling members tend to become more pressed against the outer wall surface of the curved connecting path section. As a result, a component of the slider which defines the curved connecting path section is required to have a wear resistant characteristic and a high rigidity. In order to provide a high mechanical strength, the prior art slider was typically formed from a steel material. However, this produced a disadvantage of increasing the overall weight of the slider, thereby impairing the high-speed operation. In order to cope with this situation, there was proposed to form the slider from a synthetic resin material and to provide a guide member of a thin steel plate at the deepest portion of the curved connecting path section integrally with the synthetic resin slider for an endless linear motion ball bearing assembly employing balls as the rolling members as disclosed in the Japanese Utility Model Application No. 56-51825 (Utility Model Laid-open Publication No. 60-17540) assigned to the assignee of this application.

However, it has been found that the structure described in the above-identified application still suffers from wear and the operating speed is rather limited. In particular, since the structure described in the above-identified application was proposed for an endless linear motion ball bearing assembly using balls as rolling members, there still remained a difficulty for other types of an endless linear motion rolling contact bearing assemblies, such as the one using rollers as rolling members.

SUMMARY OF THE INVENTION

In accordance with the principle of the present invention, there is provided an improved endless linear motion rolling contact bearing assembly comprising, in general, a rail, a slider and a plurality of rolling members interposed between the rail and the slider to thereby provide a rolling contact between the rail and the slider. A plurality of endless circulation paths are defined between the rail and the slider, and the plurality of rolling members are provided in the plurality of endless circulation paths. Each of the plurality of endless circulation paths includes a load path section defined between the rail and the slider, where the rolling members roll in rolling contact with both of the rail and the slider. The endless circulation path also includes a return path section and a pair of connecting path sections each of which connects the corresponding ends of the load and return path sections. Typically, the load and return path sections extend straight and in parallel.

The rail is typically formed with an inner guide groove extending straight along the longitudinal direction of the rail and the slider is formed with an outer guide groove extending straight and located opposite to the inner guide groove of the rail when assembled. Thus, a combination of the inner guide groove of the rail and the outer guide groove of the slider defines the straight load path section of the endless circulation path. In the preferred embodiment, the slider includes, in general, a center block and a pair of end blocks each provided at either a front or rear end of the center block, and the outer guide groove is formed in the center block with the curved connecting path section formed in the end block. And, the curved connecting path section is defined in the form of a channel including outer and inner wall surfaces. The end block is provided with a metal guide plate which covers the entire outer wall surface of the curved connecting path section. The metal guide plate is preferably made of a thin steel plate having a desired shape. With this structure, the end block may be formed from a synthetic resin material because the outer wall surface of the curved connecting path section is locally reinforced completely and thus the possibility of causing wear to the curved connecting path section is completely removed. Preferably, the metal guide plate has a tongue formed at one end for leading and guiding the rolling members in entering the curved connecting path section from the load path section and also a mating projection formed at the opposite end for mating connection with a mating recess formed in the center block.

It is therefore a primary object of the present invention to obviate the disadvantages of the prior art as described above and to provide an improved endless linear motion rolling contact bearing assembly.

Another object of the present invention is to provide an improved endless linear motion rolling contact bearing assembly suitable for high-speed applications.

A further object o the present invention is to provide an improved endless linear motion rolling contact bearing assembly which is light in weight and has a high wear-resistant characteristic.

A still further object of the present invention is to provide an improved endless linear motion rolling contact bearing assembly high in rigidity, structural integrity and durability and smooth in operation.

A still further object of the present invention is to provide an improved linear motion roller bearing assembly using rollers as rolling members.

Other objects, advantages and novel features of the present invention will become apparent from the following detailed description of the invention when considered in conjunction with the accompanying drawings.

DESCRIPTION OF THE PREFERRED EMBODIMENTS

Figure 1:
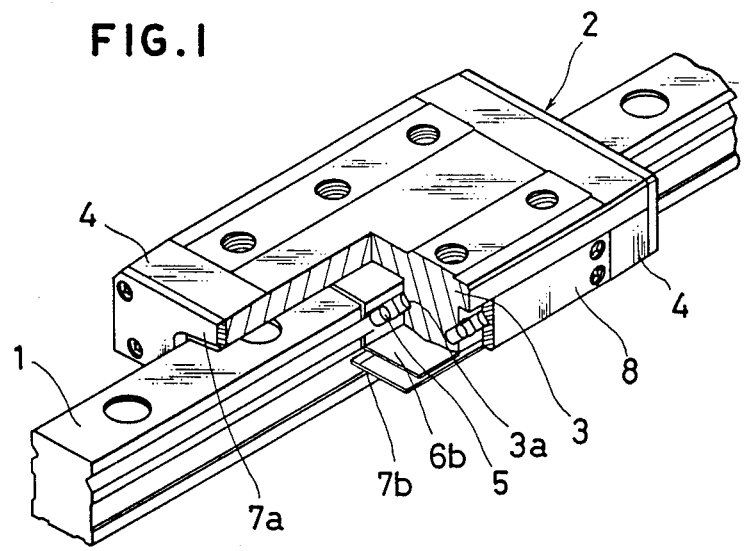
FIG. 1 is a schematic illustration showing generally in perspective and partly cut-away view an endless linear motion roller bearing assembly constructed in accordance with one embodiment of the present invention.

Referring now to FIG. 1, there is schematically shown an endless linear motion roller bearing assembly constructed in accordance with one embodiment of the present invention. As shown, the illustrated bearing assembly includes an elongated rail 1 which extends straight over a predetermined length. The rail 1 is generally rectangular in shape in the illustrated embodiment, though the present invention should not be limited to such a specific structure. The rail 1 has a top flat surface, a bottom flat surface and a pair of vertical side surfaces, each of which is formed with an inner guide groove 1a extending straight and in parallel with the longitudinal axis of the rail 1. In the illustrated embodiment, since use is made of rollers as rolling members, the inner guide groove 1a is generally V-shaped.

The illustrated bearing assembly also includes a slider 2 and a plurality of cylindrical rollers 5 interposed between the rail 1 and the slider 2 to thereby provide a rolling contact between the rail 1 and the slider 2, so that the slider 2 may slidably move relative to and along the length of the rail 1 through the rolling contact of the rollers 5. In the illustrated embodiment, each of the rollers 5 has a height or axial length which is substantially equal to its diameter, and the rollers 5 are provided in a crossed arrangement, i.e., the rotating axes of two adjacent rollers 5 extending normal to each other when viewed in the direction of movement of the rollers 5.

The slider 2 has a generally inverted-U cross sectional shape and thus the slider 2 straddles the rail 1 when assembled with the rollers 5 interposed therebetween to provide a rolling contact. In the illustrated embodiment, the slider 2 generally includes a generally rectangularly shaped center block 3 having a flat front end and a flat rear end and a pair of end blocks 4 each of which is mounted at the corresponding one of the front and rear ends of the center block 3. The center block 3 includes a horizontal portion and a pair of leg portions which are spaced apart from each other over a predetermined distance and extend downward from the horizontal portion. Each of the leg portions of the slider 3 has an inner surface which faces the rail 1 and which is formed with a V-shaped outer guide groove 3a. The outer guide groove 3a is located opposite to the V-shaped inner guide groove 1a of the rail when assembled to thereby define a load path section having a square cross section of an endless circulation path which will be described in detail later. The leg portion has an outer surface which is formed with another V-shaped guide groove 3b. A side cover plate 8 formed with a V-shaped guide groove 8b is fixedly attached to the outer side surface of the leg portion so that when the side cover plate 8 is fixedly attached to the leg portion of the center block 3, there is defined a return path section of the endless circulation path.

Figure 2:
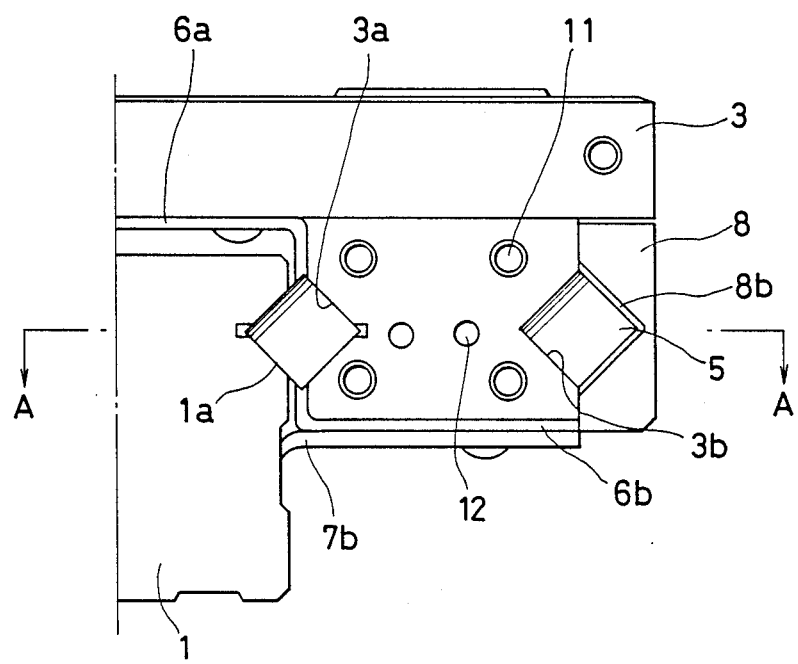
FIG. 2 is a schematic illustration showing generally in front view the right-half of the bearing assembly of FIG. 1 with its end cover plate 7a removed.

As best shown in FIG. 2, the illustrated bearing assembly is also provided with a pair of upper and lower retainer plates 6a and 6b both of which are fixedly attached to the center block 3 of the slider 2 so as to retain the rollers 5 in the load path section, thereby preventing the rollers 5 from slipping away from the load path section. The distance between the opposing tip ends of the pair of upper and lower retainer plates 6a and 6b is preferably set to be slightly larger than the diagonal size of the rollers 5. The center block 3 is preferably comprised of a synthetic resin material.

Figure 3:
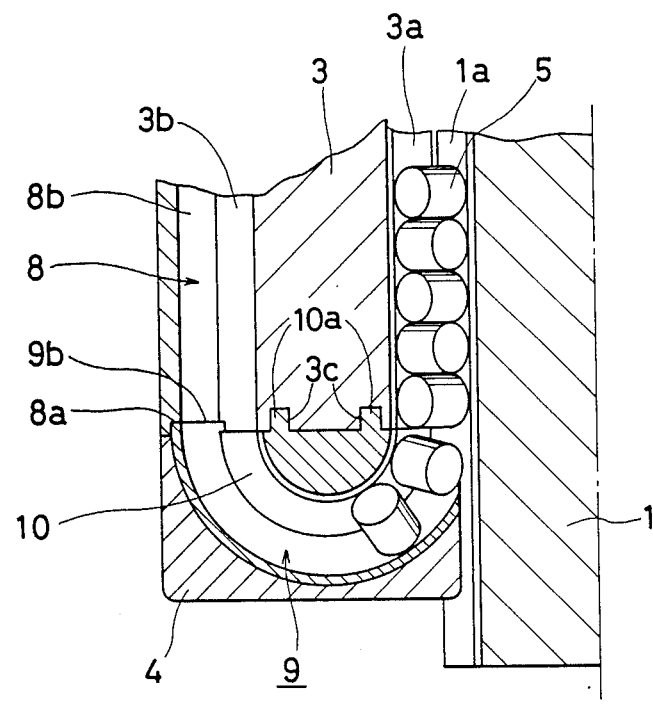
FIG. 3 is a fragmentary, cross-sectional view of the structure of the bearing assembly taken along line A—A indicated in FIG. 2.
Figure 4A:
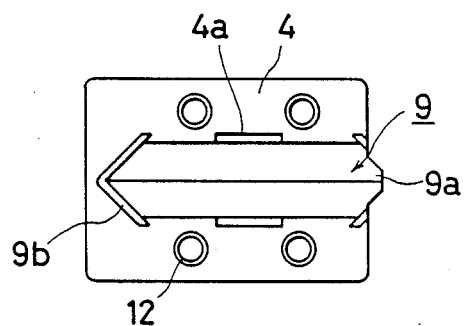
FIGS. 4a through 4d are schematic illustrations showing in plan, side, horizontal cross-sectional and vertical cross-sectional views, respectively, a combination of the end block 4 and the outer wall guide plate 9 provided in the bearing assembly shown in FIGS. 1 through 3.
Figure 4B:
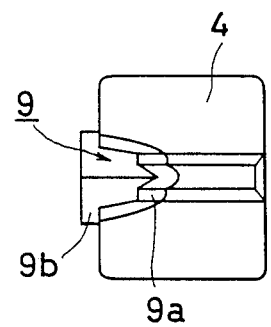
Figure 4C:
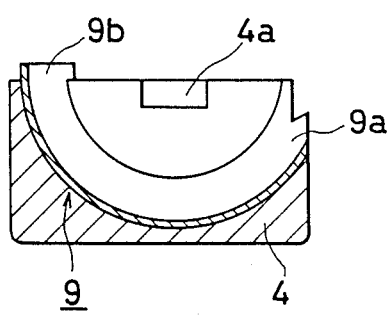
Figure 4D:
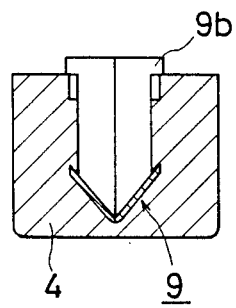
Figure 6A:
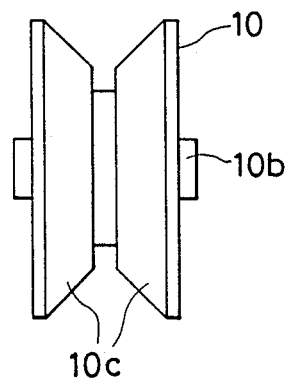
FIGS. 6a and 6b are schematic illustrations showing in front and side views, respectively, a spacer 10 to be combined with the end block 4 to define the curved connecting path section therebetween.
Figure 6B:
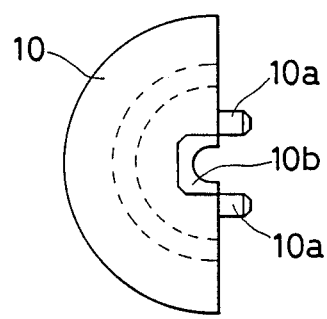

As best shown in FIG. 3, the center block 3 is formed with a pair of positioning holes 3c at its end surface and between the V-shaped guide grooves 3a and 3b, and a semicircularly shaped spacer 10 is attached to the end surface of the center block 3 with its positioning projections 10a inserted into the corresponding positioning holes 3c of the center block 3. As shown in FIGS. 6a and 6b, the spacer 10 is generally semicircular in shape and formed with a V-shaped guide groove which defines an inner wall surface of the curved connecting path section of an endless circulation path as will be described more in detail later. The spacer 10 is also formed with a pair of side projections 10b and is preferably comprised of a synthetic resin material.

Returning to FIG. 3, the end block 4 is also fixedly attached to the end surface of the center block 3 covering the spacer 10. The overall structure of the end block 4 is shown in FIGS. 4a through 4d. As shown, the end block 4 is formed with a pair of side recesses 4a for matingly receiving therein the side projections 10b of the spacer 10 to thereby determine the relative positional relationship therebetween when assembled. The end block 4 is formed with a generally semicircularly shaped cavity in which the spacer 10 may be fitted with the projections 10b of the spacer 10 received in the side recesses 4a of the end block 4. With the spacer 10 located inside of the cavity of the end block 4, there is defined the curved connecting path section of an endless circulation path for the rollers 5. The bottom end of the cavity is defined by a V-shaped outer surface and the end block 4 is integrally formed with a V-shaped metal guide plate 9 which completely covers the V-shaped outer surface of the -cavity. The metal guide plate 9 is preferably comprised of a thin steel plate. In the preferred embodiment, the end block 4 is molded from a synthetic resin material using the metal guide plate 9 as an insert so that the metal guide plate 9 is integrally and simultaneously formed when molding the end block 4. Thus, the curved connecting path section of an endless circulation path is defined between the V-shaped metal guide plate 9 and the V-shaped groove 10c of the spacer 10. It will be appreciated that the outer half of the surface of the curved connecting path section is defined by the metal guide plate 9 which provides a highly rigid and wear-resistant surface against the rollers 5. The inner half of the surface of the curved connecting path section is defined by the V-shaped groove 10c defined by the synthetic resin material.

Figure 8:
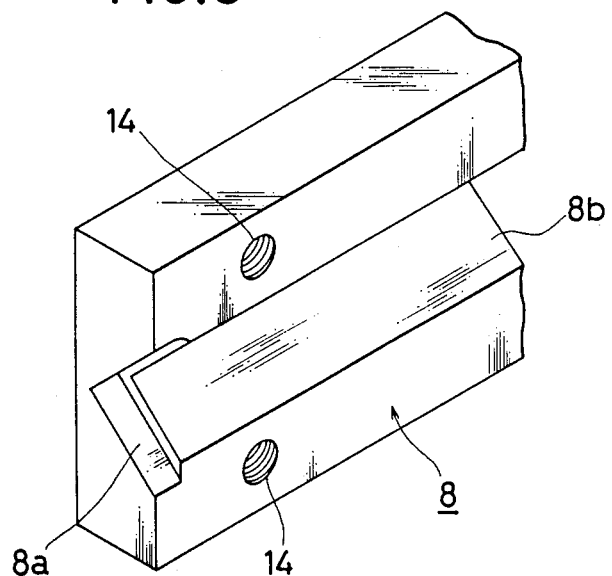
FIG. 8 is a schematic illustration showing a side cover plate 8 of the slider 2, which defines the return path section together with the center block when assembled.

The metal guide plate 9 is generally semicircular in shape and it has a generally V-shaped cross section. Since the metal guide plate 9 is inserted in a mold as an insert when forming the end block 4 by injection molding, the metal guide plate 9 is integrally formed with the end block 4. The metal guide plate 9 has one end formed with a tongue 9a somewhat convergent in shape for allowing to lead and guide the rollers 5 to enter the curved connecting path section from the load path section. With the provision of the tongue 9a, the rollers 5 may roll from the load path section to the curved connecting path section smoothly. The metal guide plate 9 is also formed with a mating projection 9b which projects beyond the surface of the end block 4. The mating projection 9b is fitted into the corresponding mating recess 8a formed at the end of the V-shaped groove 8b of the side cover plate 8 as best shown in FIG. 8. Since the mating projection 9b of the metal guide plate 9 is received in the mating recess 8a of the side cover plate 8, there is provided an increased structural integrity and a smooth transition between the curved connecting path section and the return path section, so that the rollers 5 may roll smoothly from the curved connecting path section into the return path section.

In addition, the end block 4 is provided with four mounting holes, into each of which is fitted a metal hollow pin 12, for example, of aluminum. The metal hollow pins 12 are provided when forming the end block 4 by injection molding and thus the four hollow pins 12 are integrally formed when the end block 4 is molded. These four mounting holes of the end block 4 correspond in position to threaded mounting holes 11 of the center block 3, and thus bolts may extend through the hollow pins 12 to be threaded into the threaded mounting holes 11 to thereby have the end block 4 fixedly attached to the center block 3. Such a structure is advantageous because the end block 4 is prevented from being distorted or deformed when the end block 4 is tightly bolted to the center block 3, and thus the endless circulation path for the rollers 5 is prevented from being distorted or deformed.

Figure 5A:
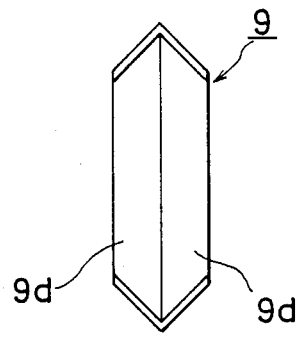
FIGS. 5a and 5b are schematic illustrations showing in front and side views, respectively, the overall structure of the outer wall guide plate 9.
Figure 5B:
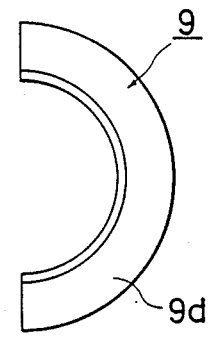

FIGS. 5a and 5b show the overall structure of the V-shaped metal guide plate 9 which may be advantageously formed by press forming from a thin steel plate. In the illustrated embodiment, the metal guide plate 9 is not formed with the tongue 9a and thus the tongue 9a must be formed after forming an assembly of the end block 4 and the metal guide plate 9 by injection molding. It is to be noted that, if desired, the outer surface of the V-shaped metal guide plate 9 may be provided with a plurality of projections or a serration so as to provide an increased integrity between the end block 4 and the metal guide plate 9. The inner surface 9d of the V-shaped guide plate 9 should be as smooth as possible since the rollers 5 roll therealong. Thus, the curved connecting path section is defined by the inner surface 9d of the V-shaped metal guide plate 9 and the V-shaped groove 10c of the semicircular spacer 10 when assembled. As a result, the endless circulation path for the rollers 5 to roll indefinitely includes the load path section defined by the V-shaped guide groove 1a of the rail 1 and the V-shaped guide groove 3a of the center block 3, the return path section defined by the V-shaped guide groove 3b of the center block 3 and the V-shaped guide groove 8b of the side cover plate 8 and a pair of curved connecting path sections each defined by the V-shaped metal guide plate 9 and the V-shaped guide groove 10c of the spacer 10.

Figure 7:
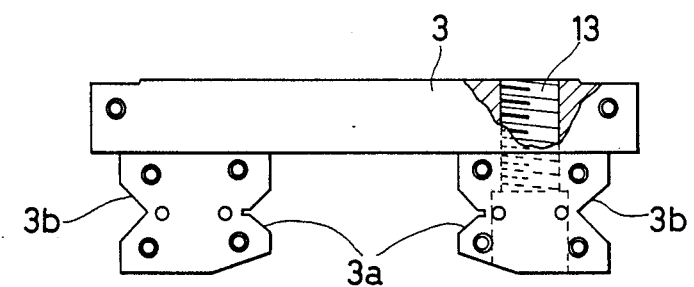
FIG. 7 is a schematic illustration showing generally in front view and partly cut-away the center block 3 of the slider 2.

FIG. 7 illustrates the center block 3 and as shown the center block 3 includes the horizontal portion and the pair of leg portions which are fixedly attached to the horizontal portion depending therefrom vertically downward. In the illustrated embodiment, the horizontal portion of the central block 3 is provided with a plurality of threaded mounting holes 13 into which bolts may be threaded from the leg portions to have the leg portions fixedly attached to the horizontal portion. As shown in FIG. 7, each of the pair of leg portions is provided with a pair of V-shaped guide grooves 3a and 3b which extend in parallel and located at the same level. Thus, in the illustrated embodiment, the endless circulation path including the V-shaped guide grooves 3a and 3b is defined in a horizontal plane.

FIG. 8 illustrates the side cover plate 8 which is formed with the V-shaped guide groove 8a and the mating recess 8a at each end of the guide groove 8a. The side cover plate 8 is also provided with a plurality of mounting holes 14 so that the side cover plate 8 may be fixedly attached to the side surface of the center block 3. The side cover plate 8 is preferably comprised of a synthetic resin material.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An endless linear motion rolling contact bearing assembly, comprising:
   a rail extending straight over a predetermined length and provided with at least one guide groove;
   a slider provided with at least one endless circulation path including a load path section, a return path section and a pair of curved connecting path sections each connecting corresponding ends of said load and return path sections and each having an outer half wall surface defined by a metal guide plate, said load path section being partly defined by a portion of said guide groove; and a plurality of rolling members provided in said endless circulation path to thereby provide a rolling contact between said rail and said slider;

wherein said slider includes a center block and a pair of end blocks, each of said end blocks having a cavity and each of said end blocks being fixedly attached to a corresponding end of said center block and each of said end blocks being integrally formed with said metal guide plate;

wherein said slider further includes a generally semicircular spacer fitted into the cavity of each of said end blocks to thereby define said curved connecting path sections; and wherein said center block and each of said end blocks and said spacer are comprised of a synthetic resin material.

2. The assembly of claim 1 wherein each of said and blocks is integrally formed with at least one hollow pin to thereby define a mounting hole thorugh which said end block may be bolted to said center block.

3. An endless linear motion rolling contact bearing assembly, comprising:

a rail extending straight over a predetermined length and provided with at least one guide groove;

a slider provided with at least one endless circulation path including a load path section, a return path section and a pair of curved connecting path sections, each of said curved connecting path sections connecting corresponding ends of said load and return path sections, and each of said curved connecting path sections having an outer wall surface defined by a metal guide plate, said load path section being partly defined by a portion of said guide groove; and a plurality of rolling members provided in said endless circulation path to thereby provide a rolling contact between said rail and said slider;

wherein said rolling members are cylindrical rollers and said endless circulation path has a generally square cross sectional shape.

4. The assembly of claim 3 wherein said metal guide plate is V-shaped.

5. The assembly of claim 4 wherein said metal guide plate is formed with a tongue at one end where said metal guide plate is connected to said load path section.

6. The assembly of claim 5 wherein said metal guide plate is formed with a mating projection which extends beyond a surface of said end block to be fitted into a mating recess formed in said slider at a junction between said curved connecting path section and said return path section.

7. The assembly of claim 6 wherein said slider includes at least one side cover plate which is fixedly attached to a side surface of said center block where said return path section is defined.

* * * * *